United States Patent [19]

Maguire et al.

[11] Patent Number: 5,506,997
[45] Date of Patent: Apr. 9, 1996

[54] DEVICE FOR MAPPING A SET OF INTERRUPT SIGNALS GENERATED ON A FIRST TYPE BUS TO A SET OF INTERRUPT SIGNALS DEFINED BY A SECOND TYPE BUS AND COMBING THE MAPPED INTERRUPT SIGNALS WITH A SET OF INTERRUPT SIGNALS OF THE SECOND TYPE BUS

[75] Inventors: David J. Maguire, Spring; Patrick L. Ferguson, Houston, both of Tex.

[73] Assignee: Compaq Computer Corp., Houston, Tex.

[21] Appl. No.: 189,078

[22] Filed: Jan. 28, 1994

[51] Int. Cl.$^6$ ............................ G06F 13/32; G06F 13/14; G06F 13/30
[52] U.S. Cl. .................. 395/800; 364/240.5; 364/241.2; 364/241.5; 364/242; 364/242.1; 364/DIG. 1; 364/DIG. 2
[58] Field of Search ...................................... 395/200, 400, 395/325–425, 275, 375, 500, 700, 725, 800, 775, 735, 734, 185.09, 183.19, 732; 364/DIG. 1, DIG. 2; 340/825.5

[56] References Cited

U.S. PATENT DOCUMENTS

| | | | |
|---|---|---|---|
| 4,172,284 | 10/1979 | Heinrich et al. | 395/725 |
| 4,779,195 | 10/1988 | James | 395/275 |
| 5,101,497 | 3/1992 | Culley | 395/734 |
| 5,161,228 | 11/1992 | Yasui et al. | 395/725 |
| 5,179,704 | 1/1993 | Jibbe et al. | 395/725 |
| 5,218,690 | 6/1993 | Boioli et al. | 395/325 |

OTHER PUBLICATIONS

82420/82430 PCISET, ISA and EISA Bridges, Intel Corp., pp. 17, 36, 98–114, 161–171, 211, 286, 322, 345, 369, 416–422, 431, 488–499(1993).

*Primary Examiner*—Daniel H. Pan
*Attorney, Agent, or Firm*—Pravel, Hewitt, Kimball & Krieger

[57] ABSTRACT

A system for mapping a PCI interrupt signal to any EISA interrupt signal, in which sharing is allowed between PCI interrupts as well as between a PCI interrupt and an EISA interrupt. The actual mapping is performed during the Power On Self Test (POST) procedure, where the computer writes appropriate values into a set of MAP and MASK registers. Each MAP and MASK register corresponds to a PCI interrupt. Thus, by programming the appropriate MAP and MASK register to certain values, the corresponding PCI interrupt can be mapped to the desired EISA interrupt signal. A decode logic then produces a set of final interrupt signals based on the state of the PCI interrupt signals, the MAP and MASK registers, and the EISA interrupt signals. The final interrupt signals are provided to an interrupt controller, which responds to the assertion of the final interrupt signals by asserting an interrupt signal to the microprocessor.

14 Claims, 6 Drawing Sheets

DEVICE FOR MAPPING A SET OF INTERRUPT SIGNALS GENERATED ON A FIRST TYPE BUS TO A SET OF INTERRUPT SIGNALS DEFINED BY A SECOND TYPE BUS AND COMBING THE MAPPED INTERRUPT SIGNALS WITH A SET OF INTERRUPT SIGNALS OF THE SECOND TYPE BUS

BACKGROUND OF THE INVENTION

1. Field of the Invention

The invention relates to the generation of interrupts in a computer system, and more particularly, to the mapping or redirection of interrupts generated on a first bus to interrupts defined by a second bus.

2. Description of the Related Art

When International Business Machines (IBM) first introduced its personal computers, the bus architecture standard used in those computers was the original IBM PC system architecture. As memory and peripheral devices increased in size and speed, the timing standard and data width used in the original IBM PC architecture was too slow and too narrow to take advantage of the advances in memory and peripheral speeds. As a result, IBM developed the PC/AT to allow the faster memory devices to be utilized more effectively. The architecture of the PC/AT has become known as the Industry Standard Architecture (ISA). However, as computer system components grew ever more powerful, ISA proved to be inadequate, which necessitated the development of a new bus standard, known as the Extended Industry Standard Architecture (EISA), to take advantage of the extra options and features available from the system components.

In computer systems, peripheral or I/O devices, such as keyboards, hard disk drives, floppy disk drives, display monitors and other components, require servicing by the microprocessor from time to time. One method of determining whether the devices require servicing by the microprocessor is by use of polling, in which the microprocessor tests each I/O device in sequence to determine if the device needs servicing. A disadvantage of this method is that the microprocessor is continuously executing polling cycles. Thus, an increase in the number of I/O devices would adversely affect the system throughput.

In response to the limitations of the polled method of determining whether I/O devices require servicing, a method known as interrupt driven I/O was developed. In the interrupt method, each I/O device asserts an interrupt signal whenever it requires servicing by the microprocessor. In computer systems incorporating interrupt driven I/O, a programmable interrupt controller (PIC) is coupled to the system bus to function as an overall manager in accepting interrupt requests from the I/O devices. The PIC determines which of the incoming requests has the highest priority and ascertains whether any of the incoming requests has a higher priority value then the level currently being serviced. The PIC issues an interrupt to the microprocessor based on this determination. Thus, the interrupt method allows an I/O device to provide an external asynchronous input that informs the microprocessor when servicing is required. As a result, the microprocessor is freed from having to perform unnecessary polling cycles on the system bus to determine when servicing is required by the I/O devices.

In ISA and EISA systems, the interrupt controller includes two 8259 programmable interrupt controllers by Intel Corporation (Intel). Each 8259 interrupt controller handles up to eight vectored priority interrupts for the microprocessor. One of the two 8259 interrupt controllers is classified as the master interrupt controller, which receives EISA interrupt request lines EISA_IRQ<7:0>. The other interrupt controller is classified as the slave interrupt controller, which receives interrupt request lines EISA_IRQ<15:8>. Each 8259 interrupt controller has an interrupt output INT. When one or more of the interrupt request lines EISA_IRQ<15:0> are asserted, the 8259 interrupt controllers make a determination of the priority of the EISA_IRQ lines that are asserted and whether any of the EISA_IRQ lines are to be masked. If a mask bit corresponding to an EISA_IRQ line is set, then the 8259 interrupt controller ignores the assertion of the EISA_IRQ line. The EISA interrupts have the following priority arrangement from the highest priority to the lowest: EISA_IRQ0, EISA_IRQ1, EISA_IRQ8, EISA_IRQ9, EISA_IRQ10, EISA_IRQ11, EISA_IRQ12, EISA_IRQ13, EISA_IRQ14, EISA_IRQ15, EISA_IRQ3, EISA_IRQ4, EISA_IRQ5, EISA_IRQ6 and EISA_IRQ7. After the 8259 interrupt controllers have completed their determinations, the master interrupt controller asserts its interrupt output to the system bus. When the microprocessor receives an interrupt request, it finishes completion of the current instruction. Next, the microprocessor saves the state of the interrupted program, which includes its address and the contents of certain registers, onto a stack to allow resumption of the interrupted program once the interrupt has been serviced. Then the microprocessor executes an interrupt acknowledge cycle, which causes a signal INTA, to be generated on the EISA system bus. When the 8259 interrupt controllers receive the signal INTA, indicating an interrupt acknowledge cycle, one of the 8259 interrupt controllers provides an eight-bit interrupt vector onto the EISA data bus SD<7:0>. The microprocessor then determines the starting address of the interrupt service routine based on the interrupt vector. The interrupt service routine is then executed. After the interrupt service routine has finished execution, the interrupted program state is restored from the stack, and program execution resumes at the appropriate instruction.

A mezzanine bus architecture standard known as the Peripheral Component Interconnect (PCI) is a relatively recent development. PCI was developed to allow for connection of highly integrated peripheral components on the same bus as the processor/memory system; that is, PCI standardizes a bus on which peripheral components can directly connect without the need for glue logic. Thus, PCI provides a bus standard on which high performance peripheral devices, such as graphics devices and hard disk drives, can be connected with the processor/memory module, thereby permitting these high performance devices to avoid the general access latency and the bandwidth constraints that would have occurred if the devices were connected to standard I/O expansion buses such as EISA. More details on the PCI bus can be obtained by review of the PCI Specification 2.0 from PCI Special Interest Group in care of Intel Corporation, which is hereby incorporated by reference.

In a computer system that comprises a PCI subsystem coupled to an EISA expansion bus, interrupt signals generated on the PCI bus must comply with the EISA system requirements. Thus, in PCI/EISA systems, interrupts generated on the PCI bus must be redirected or mapped to EISA interrupts. It is desirable that an interrupt generated by a peripheral device connected to the PCI bus be mapped to the same IRQ that it would have been allocated if the peripheral device was connected to the EISA bus. Furthermore, it is desirable that flexibility exists to allow a PCI interrupt to be redirected or mapped to any EISA interrupt.

SUMMARY OF THE PRESENT INVENTION

A device according to the present invention redirects or maps a set of interrupt signals generated on a PCI bus to a set of interrupt signals defined by the EISA expansion bus. The device can map any interrupt signal generated on the PCI bus to any interrupt signal defined by the EISA bus. In the preferred embodiment, the interrupt lines IRQ15, IRQ14, IRQ12, IRQ11, IRQ10, IRQ9, IRQ7, IRQ6, IRQ5, IRQ4 and IRQ3 can be shared. As a consequence, the PCI interrupts can be mapped to any of the above listed 11 interrupt lines. The PCI interrupts can share the IRQ lines with each other or with other EISA interrupts. The interrupt lines IRQ13, IRQ8, IRQ2, IRQ1 and IRQ0 are reserved for other system functions and are not available for sharing. Thus, in the preferred embodiment, the PCI interrupts cannot be mapped to those interrupt lines, though mapping to those interrupts would be possible if the interrupts were not reserved. The redirection or mapping of the PCI interrupts is accomplished by loading in predefined values into a set of MAP and MASK registers during the Power On Self Test (POST) procedure. A register exists for latching interrupt signals generated on the PCI bus. The contents of the PCI interrupt register and the MAP and MASK registers are provided to a decoder for generation of a set of interrupt signals PIRQ3, PIRQ4, PIRQ5, PIRQ6, PIRQ7, PIRQ9, PIRQ10, PIRQ11, PIRQ12, PIRQ14 and PIRQ15. Each interrupt signal generated by the decoder corresponds to an EISA_IRQ signal; that is, PIRQ3 corresponds to EISA_IRQ3, PIRQ4 corresponds to EISA_IRQ4, and so forth. A set of AND gates are provided to combine the PIRQ signals generated by the decoder with the corresponding EISA_IRQ signals. The AND gates generate a set of final interrupt signals that are provided to the interrupt controller. If one or more of the final interrupt signals are asserted, the interrupt controller asserts an interrupt output to a microprocessor module. The microprocessor module responds with the appropriate interrupt acknowledge cycle, which causes the interrupt acknowledge input to the interrupt controller to be asserted. In response to the assertion of the interrupt acknowledge signal, the interrupt controller provides the vectored address of the interrupt service routine.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
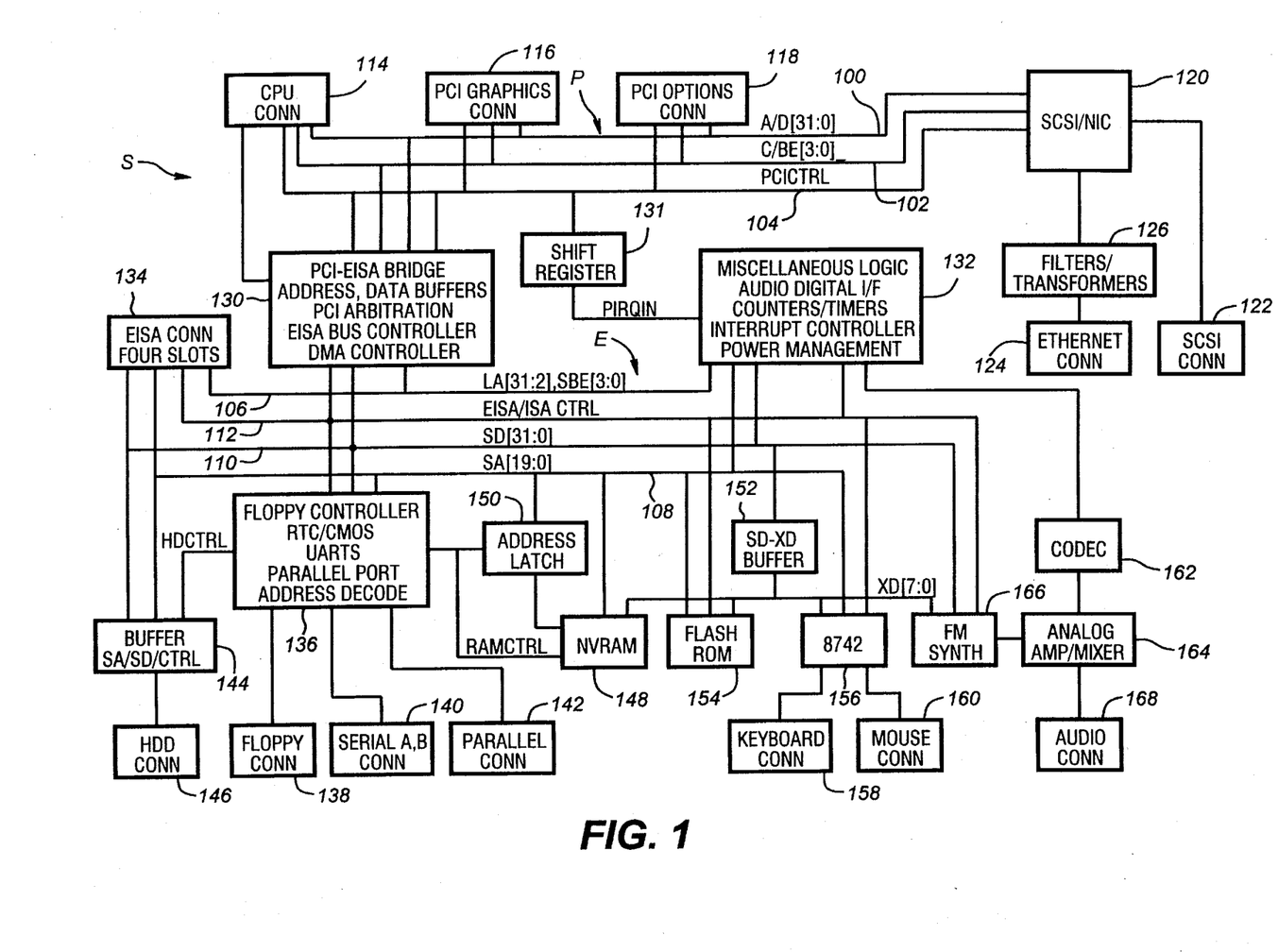
FIG. 1 is a block diagram of a system board including a mapping device according to the present invention.

Referring now to FIG. 1, the system board S of a computer system according to the present invention is shown. In the preferred embodiment, the system board contains circuitry and slots for receiving interchangeable circuit boards. In the preferred embodiment, there are two primary buses located on the system board S. The first bus is the PCI or Peripheral Component Interconnect bus P which includes address/data portion 100, control and byte enable portion 102 and control signal portion 104. The second primary bus on the system board S is the EISA bus E. The EISA bus E includes LA address portion 106, SA address portion 108, SD data portion 110 and EISA/ISA control signal portion 112. The PCI and EISA buses P and E form the backbones of the system board S.

Figure 2A:
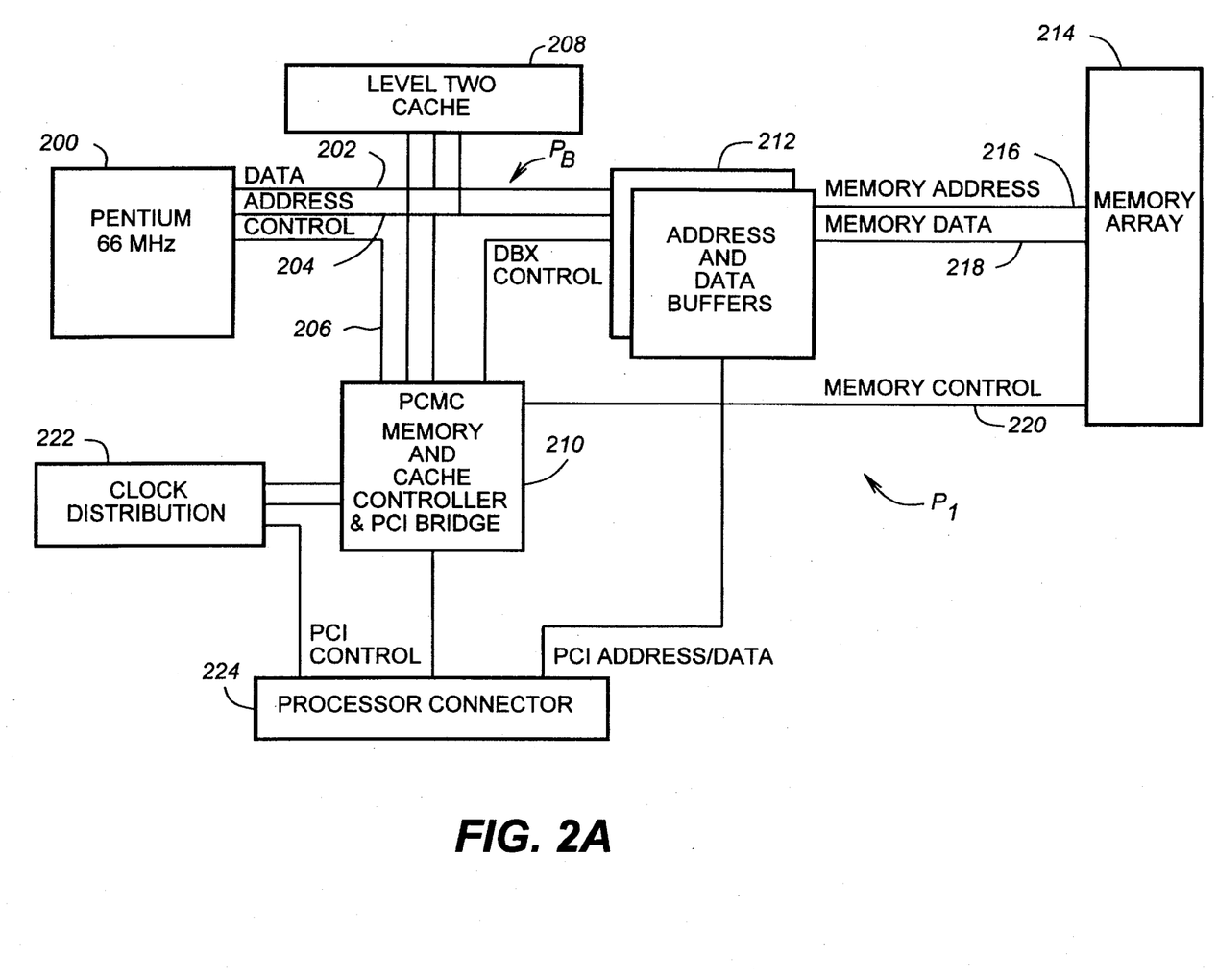
FIGS. 2A and 2B are block diagrams of alternate processor boards for use with the system board of FIG. 1.
Figure 2B:
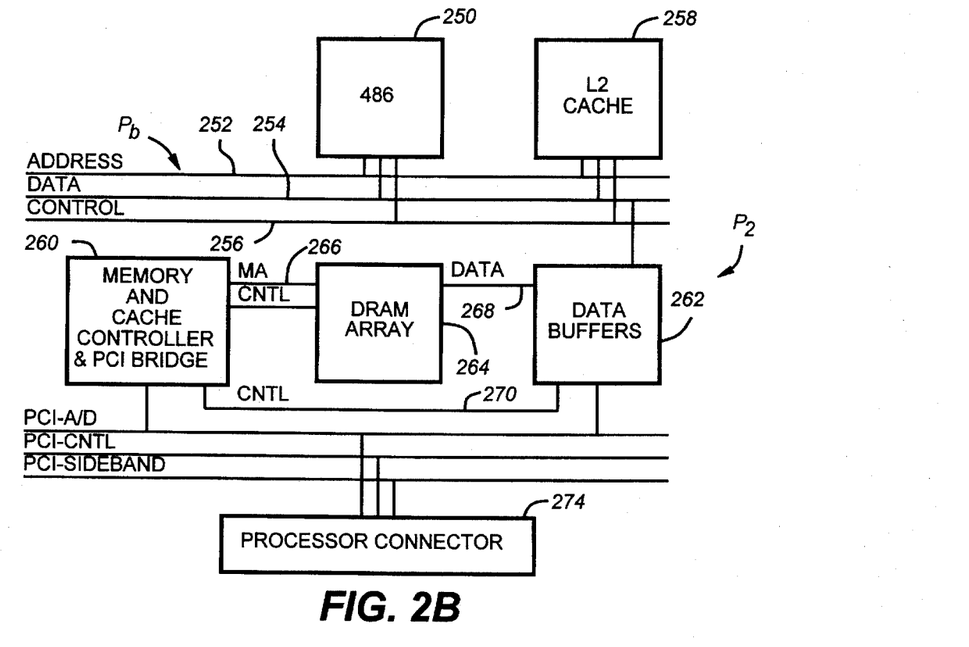

A CPU connector 114 is connected to the PCI bus P to receive interchangeable processor cards, such as those shown in FIGS. 2A and 2B. A PCI graphics connector 116 is connected to the PCI bus P to receive a video graphics card (not shown). A PCI option connector 118 is also connected to the PCI bus P to receive any additional cards designed according to the PCI standard. In addition, a SCSI and network interface (NIC) controller 120 is connected to the PCI bus P. Preferably the controller 120 is a single integrated circuit and includes the capabilities necessary to act as a PCI bus master and slave and the circuitry to act as a SCSI controller and an Ethernet interface. A SCSI connector 122 is connected to the controller 120 to allow connection of various SCSI devices, such as hard disk drives and CD-ROM drives. An Ethernet connector 124 is provided on the system board S and is connected to filter and transformer circuitry 126, which in turn is connected to the controller 120. This forms a network or Ethernet connection for connecting the system boards and computer to a local area network (LAN).

A PCI-EISA bridge 130 is provided to convert signals between the PCI bus P and the EISA bus E. The PCI-EISA bridge 130 includes the necessary address and data buffers and latches, arbitration and bus master control logic for the PCI bus, EISA arbitration circuitry, an EISA bus controller as conventionally used in EISA systems and a DMA controller. Preferably the PCI-EISA bridge 130 is a single integrated circuit, but other combinations are possible. A miscellaneous system logic chip 132 is connected to the EISA bus E. In the preferred embodiment, the miscellaneous system logic chip 132 is implemented as an ASIC. The miscellaneous system logic chip 132 contains a digital audio interface, counters and timers as conventionally present in personal computer systems, an interrupt controller for both the PCI and EISA buses P and E and power management logic, as well as other miscellaneous circuitry. A shift register 131 receives PCI interrupt signals from the PCI bus P. The PCI interrupt signals are latched in parallel into the shift register 131. To conserve pins on the miscellaneous system logic chip 132, the shift register provides the PCI interrupts to the miscellaneous chip 132 via a serial input pin signal PIRQIN. A series of four EISA slots 134 are connected to the EISA bus E to receive ISA and EISA adapter cards. A combination I/O chip 136 is connected to the EISA bus E. The combination I/O chip 136 preferably includes a floppy disk controller, real time clock (RTC)/CMOS memory, two UARTs, a parallel port and various address decode logic. A floppy disk connector 138 for receiving a cable to a floppy disk drive is connected to the combination I/O chip 136. A pair of serial port connectors are also connected to the combination I/O chip 136, as is a parallel port connector 142. A buffer 144 is connected to both the EISA bus E and the combination I/O chip 136 to act as a buffer between the EISA bus E and a hard disk drive connector 146 to allow connection of an IDE-type hard disk drive. A non-volatile random access memory (NVRAM) 148 is connected to the EISA bus E and receives its control signals from the combination I/O chip 136. An address latch 150 is connected to the EISA bus E and controlled by the combination I/O chip 136 to provide additional addressing capability for the NVRAM 148. Preferably the NVRAM 148 is used to contain certain system information. A data buffer 152 is connected to the SD portion of the EISA bus E to provide an additional data bus XD for various additional components of the computer system. The NVRAM 148 is connected to the XD data bus to receive its data bits. A flash ROM 154 receives its control and address signals from the EISA bus E and is connected to the XD bus for data transfer. Preferably, the flash ROM 154 contains the BIOS information for the computer system and can be reprogrammed to allow for revisions of the BIOS. An 8742 or keyboard controller 156 is connected to the XD bus and EISA address and control portions 108 and 112. The keyboard controller 156 is of conventional design and is connected in turn to a keyboard connector 158 and a mouse or pointing device connector 160.

The computer system of the preferred embodiment also includes audio capabilities. To this end a CODEC chip 162 is connected to the miscellaneous system logic chip 132 and to an analog amplifier and mixer chip 164. An FM synthesizer chip 166 is connected to the analog amplifier and mixer 164 and receives digital information from the XD bus. The FM synthesizer 166 is also connected to the control and data portions 110 and 112 of the EISA bus E and is controlled by the miscellaneous system logic chip 132. An audio connector 168 is provided to allow external audio connections to the computer and is connected to the outputs and inputs of the analog amplifier and mixer 164.

Referring now to FIGS. 2A and 2B, alternate processor board designs are shown. In the processor board P1 of FIG. 2A, the CPU or processor 200 is the Pentium processor from Intel, preferably operating at 66 MHz. The processor 200 provides data, address and control portions 202, 204 and 206 to form a processor bus PB. A level 2 (L2) or external cache memory system 208 is connected to the processor bus PB to provide additional caching capabilities to improve performance of the computer system. A processor cache and memory controller (PCMC) and PCI bridge chip 210, such as the 82434LX chip from Intel Corporation is connected to the control portion 206 and to the address portion 204. The PCMC 210 is connected to the L2 cache 208 as it incorporates the cache controller and therefore controls the operations of the cache memory devices in the L2 cache 208. The PCMC 210 is also connected to control a series of address and data buffers 212. The address and data buffers 212 are preferably the 82433LX from Intel and are utilized to handle memory addressing and memory data to a main memory array 214. The address and data buffers 212 are connected to the processor data portion 202 and processor address portion 204 and receive control signals from the PCMC 210. The address and data buffers 212 provide a memory address bus 216 and a memory data bus 218 to the memory array 214. A memory control signal bus 220 is provided from the PCMC 210. Clock distribution and generation circuitry 222 is associated with the processor card P1 and is connected to the PCMC 210. A processor connector 224, such as a card edge, is provided to be mateably received by the processor connector 114. The processor connector 224 is connected to the PCMC 210, the address and data buffers 212 and the clock distribution circuitry 222 to provide clocks to the computer system and to provide a PCI interface to allow the processor 200 to access the PCI and EISA buses P and E and to allow PCI and EISA bus masters to access the main memory array 214.

Referring now to FIG. 2B, an alternate processor card P2 is shown. In the processor card P2, the processor 250 is preferably a 486 class processor, such as the 486 S-class processors. Again, address, data and control portions 252, 254 and 256 are developed from the processor 250 to form a processor bus PB. An L2 cache memory 258 is connected to the processor bus PB, while a cache and memory controller and PCI bridge chip (CDC) 210, such as the 82424TX from Intel, is also connected to the processor bus PB. The CDC 210 controls the operations of the L2 cache 258, as similarly performed in processor card P1 by the PCMC 210. A main memory array 264 receives its address information directly from the CDC 260, as well as its control signals. Data buffers 262, preferably the 82423TX from Intel, are connected between the processor data portion 254 and a data bus 268 to the memory array 264. The data buffers 262 are controlled by the CDC 260. Again, a processor connector 274 is provided to be mateably received with the processor connector 114. The CDC 260 is connected to the processor connector 274, as are the data buffers 262.

Figure 3:
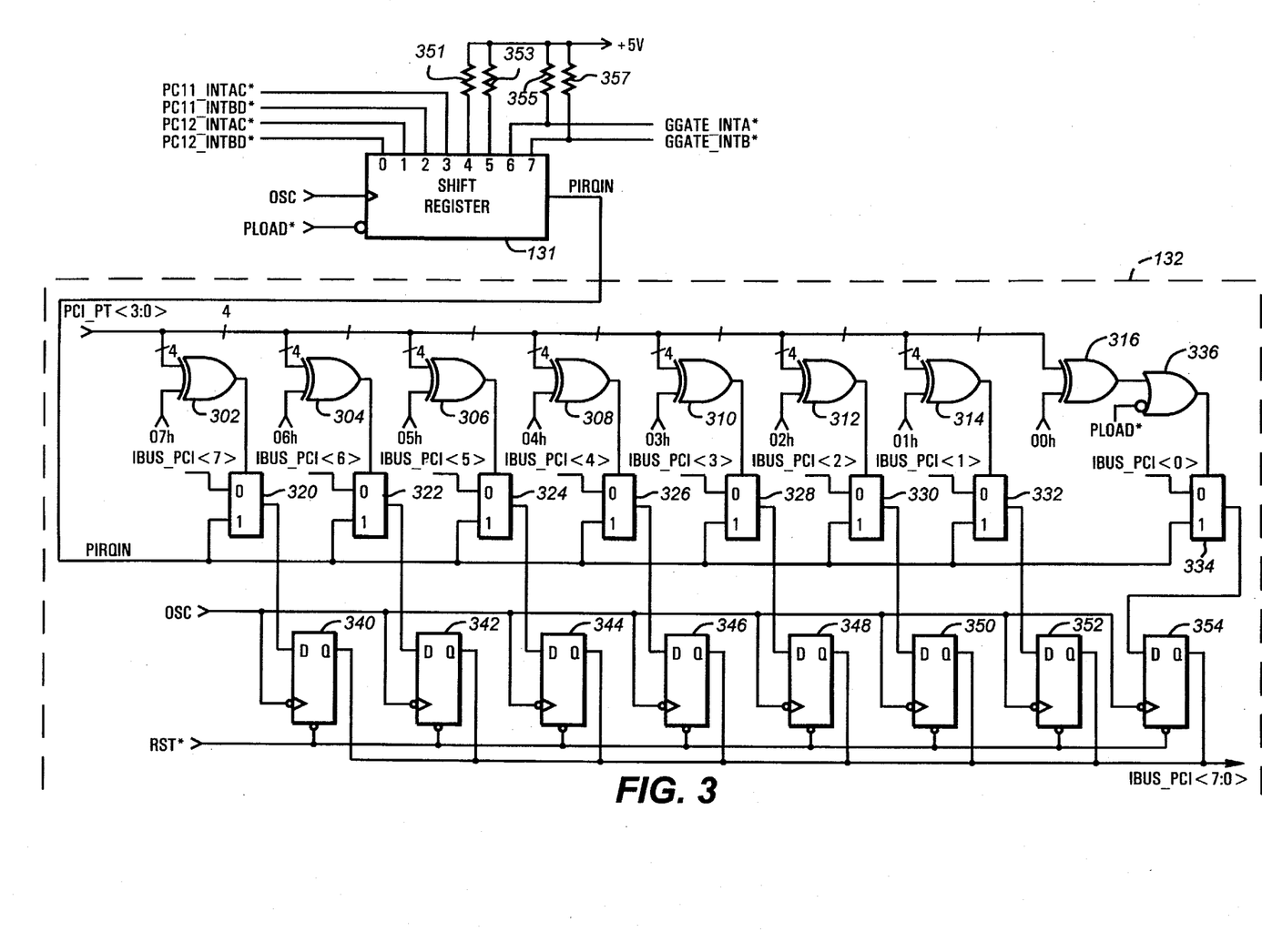
FIG. 3 shows a shift register for receiving PCI interrupt signals and another register connected to the serial output/of the shift register.

Referring now to FIG. 3, the shift register 131 and a register located in the miscellaneous system logic chip 132 are shown for storing PCI interrupt signals generated on the PCI bus. As a preliminary note, a designation of XXh (XX is a number) in the ensuing discussion signifies a hexadecimal number. In addition, a signal mnemonic followed by the character "*" indicates that the signal is active low.

To conserve pins on the miscellaneous system logic chip 132, the state of the PCI interrupt signals stored in the shift register 131 are shifted serially through the pin PIRQIN into a load control register comprising D flip-flops 340–354 located in the miscellaneous chip 132. When a signal PLOAD* connected to the shift register 131 is asserted low, the PCI interrupts are loaded in parallel into the shift register 131. The interrupt signals generated on the PCI bus are designated as signals PCI1_INTAC,, PCI1_INTBD,, PC12_INTAC*, PC12_INTBD*, GGATE_INTA* and GGATE_INTB*. It is noted that according to the PCI specification, each PCI slot is allotted four interrupt request lines. However, the interrupt controller located in the miscellaneous system logic chip 132 according to the preferred embodiment of the present invention supports four interrupt request lines from the system board but only two interrupt request lines from each PCI slot. The four interrupt lines from each slot are designated as interrupts INTA*, INTB*, INTC*, and INTD* and they are each driven by an open drain driver. Interrupts INTA* and INTC* are tied together and interrupts INTB, and INTD* are tied together to form two interrupt lines INTAC* and INTBD* from each slot on the PCI bus. Thus, the PCI interrupt signals PCI1_INTAC* and PCI1_INTBD, are generated by a device connected to option connector 118. The PCI interrupt signals PC12_INTAC and PC12_INTBD are generated by the video graphics card connected to the PCI graphics connector 116. As the signals PCI1_INTAC*, PCI1_INTBD*, PC12_INTAC*, and PC12_INTBD* are each driven by a open drain driver, each of the signals are tied to a high state through resistors (not shown). The interrupt signals GGATE_INTA* and GGATE_INTB*, originate from the SCSI/NIC controller 120. The interrupt signal GGATE_

INTA* is generated by the SCSI controller portion and the interrupt signal GGATE_INTB* is generated by the Ethernet controller portion. The interrupt signals GGATE_INTA* and GGATE_INTB* are connected through resistors 355 and 357, respectively, to a high state represented by system voltage +5 V. Two interrupt lines are left unused in the preferred embodiment, and those lines are tied to a high state through resistors 351 and 353.

The shift register 131 is clocked by the rising edge of a clock OSC having a frequency of 14.318 MHz in the preferred embodiment. On the rising edge of the clock OSC, a bit of data is serially shifted out to the signal PIRQIN. The clock OSC is provided to the clock input of each of the series of D flip-flops 340–354, which drive the signals IBUS_PCI<7:0>. Data is latched into the D input of each of the D flip-flops 340–354, which are connected to the outputs of a series of 2-to-1 multiplexors 320–334, on the falling edge of the clock OSC. The multiplexors 320–334 select one of the two signals PIRQIN or IBUS_PCI<X>, in which X ranges from 7 to 0, respectively. The select inputs of the multiplexors are controlled by a set of comparators 302–316, which compare the value represented by the signals PCI_PT<3:0>with the value X, in which X ranges from 7 to 0, respectively. Thus, if the value of the signals PCI_PT<3:0>is equal to 7, then the comparator 302 outputs a low state to the select input of the multiplexor 320. As a result, the multiplexor 320 selects the signal PIRQIN to be outputted. Otherwise, the signal IBUS_PCI<7>is selected. This is repeated for the multiplexors 322–332. The D flip-flop 354 is controlled a little differently. The select input of the signal multiplexor 334 is driven by an OR gate 336, whose inputs are the inverted state of the signal PLOAD*, and the output of the comparator 316. Thus, if the signal PLOAD* is active low, the multiplexor 334 selects the input signal IBUS_PCI<0>; consequently, the state of the D flip-flop 354 remains unchanged. However, if the state of the signal PLOAD* is high, and if the signals PCI_PT<3:0>is equal to 0, then the comparator 316 outputs a low state to an input of the OR gate 336. The OR gate 336 outputs a low state to the select input of the multiplexor 334, causing the multiplexor 334 to select the signal PIRQIN to output to the D flip-flop 334. An interlock in the form of the signal PLOAD* is provided to the OR gate 336 because the signals PCI_PT<3:0>remain at the value 0 for two clock cycles, once when the signal PLOAD* is asserted low, and once on the first clock cycle after PLOAD* returns high. This is explained in more detail below in the discussion for FIG. 4. It is desired that the state of the signal PIRQIN be ignored when the signal PLOAD* is low, which indicates that the shift register 131 is being loaded. Thus, after the signal PLOAD* is deasserted high, the state of the PCI interrupt signals contained in the shift register 131 are loaded serially into the load control register comprising the D flip-flops 340–354. When a reset signal RST,, which is connected to the preset input of each of the D flip-flops 340–354, is asserted low, each D flip-flop is reset to a high state on the falling edge of the signal RST*, thereby causing the bus IBUS_PCI<7:0>to contain the value 0FFh.

Figure 4:
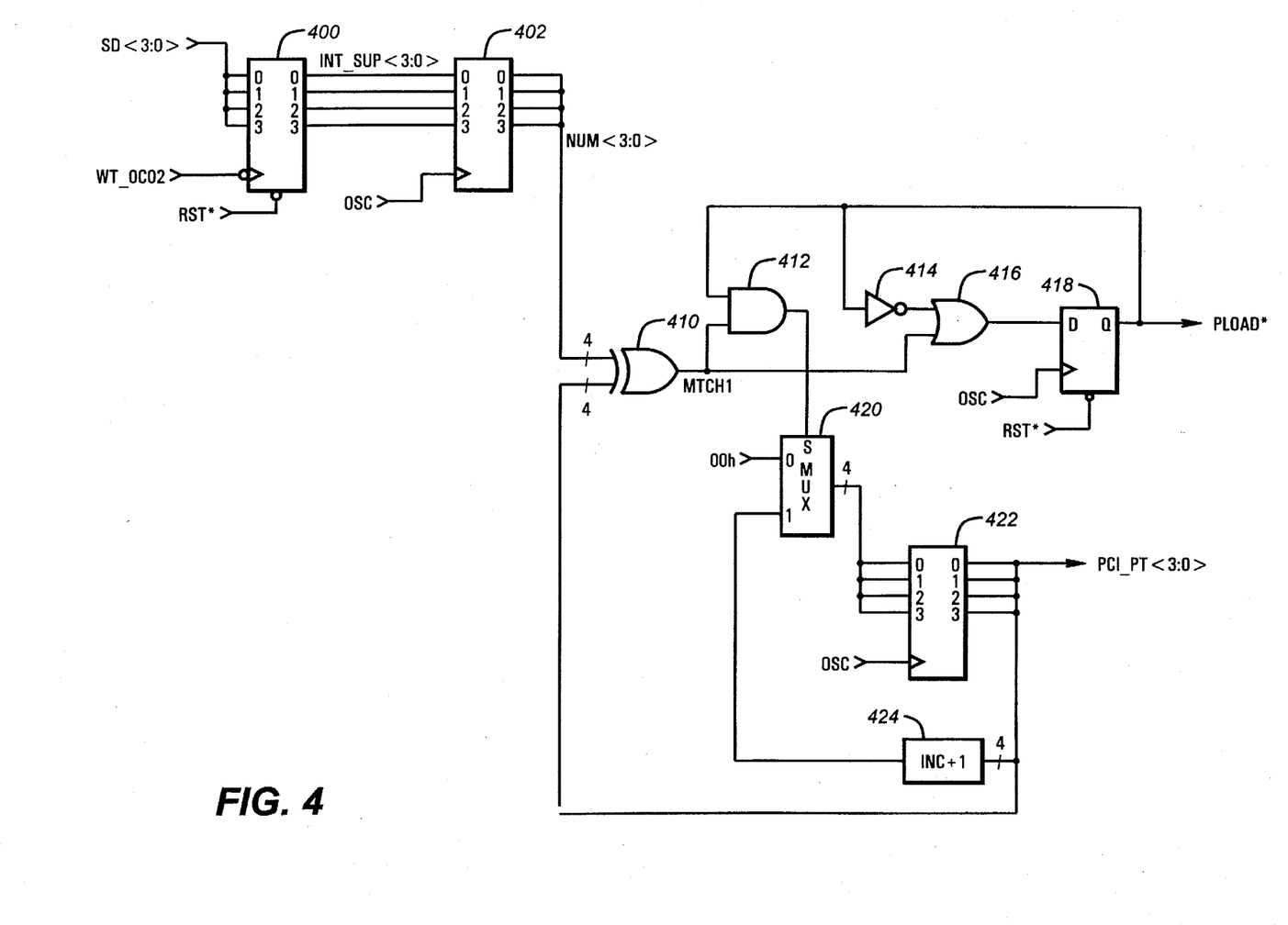
FIG. 4 is a circuit for the generation of the control signals for the registers of FIG. 3.

Referring now to FIG. 4, the control logic that generates the latching signals for the registers of FIG. 3 is shown. It is noted that the control logic of FIG. 4 is part of the miscellaneous system logic chip 132. As discussed above, the signal PLOAD*, when asserted low, latches in the state of the PCI interrupt signals into the shift register 131. The signals PCI_PT<3:0>provide control for the D flip-flops 340–354. Since there are eight PCI interrupt signals, and the PCI interrupt signals are shifted into the load control register located in the miscellaneous system logic chip 132 one bit at a time, the signal PLOAD*, is asserted once every 9 OSC clocks. The signal PLOAD* is asserted once every 9 OSC clocks instead of once every 8 OSC clocks because data from the shift register 131 is ignored when the signal PLOAD*, is asserted low. As a result, the worst case latency for any PCI interrupt is about 560 nanoseconds. It is noted that since the signals PCI_PT<3:0>can count up to the maximum value of 15, the load control register can be programmed to accept a maximum of 16 PCI interrupt signals, though only 8 are used in the preferred embodiment.

In the preferred embodiment, a register 400 is provided to indicate the number of PCI interrupts being utilized. When a write operation is performed to arbitrary address 0C02h, a signal WT_0C02 is asserted. The falling edge of the signal WT_0C02 causes the register 400 to latch in data from the data bus SD<3:0>, which contains the value 7 in the preferred embodiment as 8 PCI interrupts are being utilized. In the preferred embodiment, the reset signal RST, falling low also resets the register 400 to contain the value 7. The outputs of the register 400, designated as signals INT_SUP<3:0>, are provided to the inputs of a register 402. The signals INT_SUP<3:0>are latched into the register 402 on the rising edge of the clock OSC. The outputs of the register 402 drive signals NUM<3:0>for the number of interrupts. The signals NUM<3:0>are compared to the signals PCI_PT<3:0>by a comparator 410. If the value represented by the signals NUM<3:0>is not equal to the value represented by the signals PCI_PT<3:0>, then the comparator 410 drives a signal MTCH1 high, which is connected to an input of an OR gate 416 and an input of a NAND gate 412. The signal MTCH1 being driven high causes the OR gate 416 to output a high state to the D input of a D flip-flop 418. The output of the OR gate 416, which is at a high state, is latched into the D flip-flop 418 on the rising edge of the clock OSC. As a result, the signal PLOAD* is driven to a high state by the D flip-flop 418. The signal PLOAD* is fed back to an input of the AND gate 412 and to the input of an inverter 414. The output of the inverter 414 is fed to an input of the OR gate 416. Thus, if the signal PLOAD* is at a high state, the inverter 414 drives a low state to the input of the OR gate 416, which enables the OR gate 416 to accept the state of the signal MTCH1. The signal PLOAD*, is driven low by the D flip-flop 418 when the value represented by the signals NUM<3:0>is equal to the value represented by the signals PCI_PT<3:0>. This causes the comparator 410 to drive the signal MTCH1 low. Since the output of the inverter 414 is also driven low, the OR gate 416 outputs a low state to the input of the D flip-flop 418. Consequently, on the next rising edge of the clock OSC, a low value is latched into the D flip-flop 418 and the signal PLOAD* is driven low. The signal PLOAD* being driven low causes the inverter 414 to output a high state to the input of the OR gate 416, thereby forcing the output of the OR gate to drive high. Thus, on the next rising edge of the clock OSC, the D flip-flop 418 latches in a high state, and the signal PLOAD* is driven back high. Thus, the signal PLOAD* is kept at a high state until the value represented by the signals PCI_PT<3:0>is equal to the value represented by the signals NUM<3:0>. When that condition occurs, the signal PLOAD* is driven low for one clock cycle. As will be discussed in more detail below, the signals PCI_PT<3:0>are incremented from the value zero up to the value represented by the signals NUM<3:0>, whereupon the value of the signals PCI_PT<3:0>would again be returned to zero. Since the preferred value of the signals NUM<3:0>is 7, the signal PLOAD* is driven low once every 9 OSC clocks. On the falling edge of the reset signal RST*, the D flip-flop 418 is reset low.

In the preferred embodiment, the value represented by the signals PCI_PT<3:0> ranges from the value 0 to the value 7. The outputs of a multiplexer 420, which is connected to the inputs of a 4-bit register 422, provides the value zero if either the signal PLOAD* is driven low or the value represented by the signals NUM<3:0> is equal to the value represented to by the signals PCI_PT<3:0>. When either of the two conditions is true, the AND gate 412 outputs a low state to the select input of the multiplexer 420. If neither of the conditions is true, then the multiplexor 420 accepts the incremented value of the signals PCI_PT<3:0>. The register 422 latches in the outputs of the multiplexer 420 on the rising edge of the clock OSC and drives them onto the signals PCI_PT<3:0>. The value represented by the signals PCI_PT<3:0> is incremented by 1 by an incrementer 424. The incrementer 424 provides the incremented value of the signals PCI_PT<3:0> to the inputs of the multiplexer 420. In this fashion, the signals PCI$_{13\ PT}$<3:0> are incremented from the value zero to the value 7, whereupon the signals PCI_PT<3:0> return again back to the value zero. It is noted that the signals PCI_PT<3:0> remain at the value zero for two OSC clocks. When the value represented by the signals PCI_PT<3:0> is incremented to a value equal to that represented by the signals NUM<3:0>, the register loads in the value zero on the next OSC clock. Since the signal PLOAD* is also driven low at this time, the outputs of the multiplexer 420 are kept at the value zero. Thus, on the next OSC clock, the register again latches in the value zero.

Figure 5:
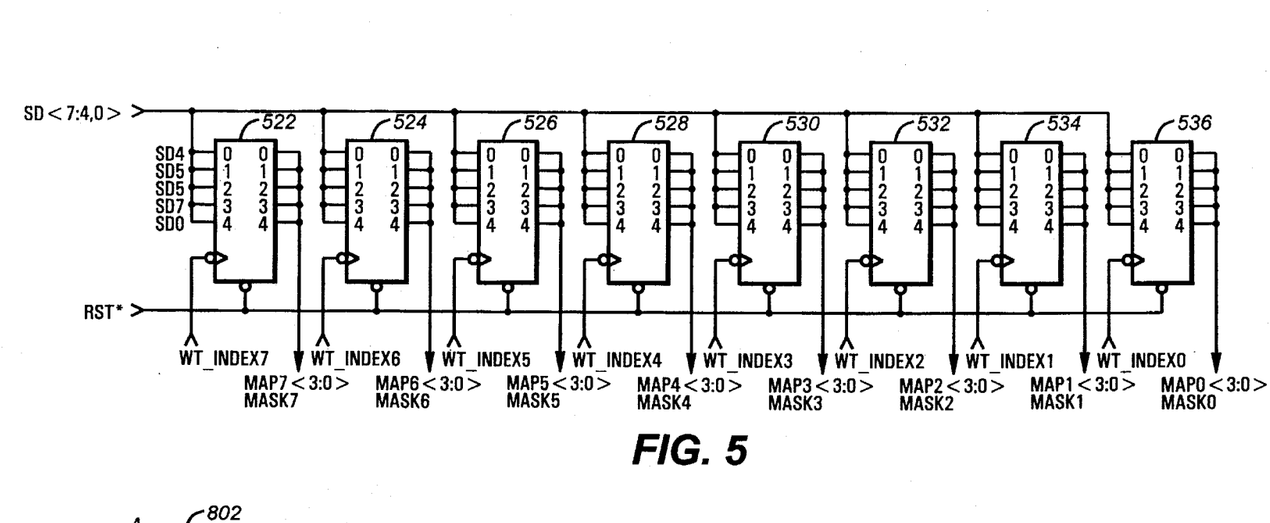
FIG. 5 is a register for storing the mapping and masking information for the PCI interrupt signals.

Referring now to FIG. 5, the MAP and MASK registers are shown that contain the redirection or mapping information for the PCI interrupt signals. It is noted that the circuitry shown in FIG. 5 is part of the miscellaneous system logic chip 132. Eight 5-bit registers 522–536 are each connected to the data bus SD<7:4> and SD<$_0$>. Input bits 0–3 of the registers 522–536 are connected to bits 4–7 of the data bus SD<7:4>, respectively. Input bit 4 of the registers 522–536 are connected to the data bus SD<0>. The registers 522–536 drive the signals MAPY<3:0> on corresponding output pins 3–0 and the signal MASKY on corresponding output pin 4, where Y represents the values 7 to 0. Each of the registers 522–536 corresponds to a PCI interrupt. Register 522, which generates signals MAP7<3:0> and MASK7, corresponds to PCI interrupt signal GGATE_INTB*. Register 524, which generates signals MAP6<3:0> and MASK6, corresponds to interrupt signal GGATE_INTA*. Registers 526 and 528, which generate signals MAP5<3:0> and MASK5 and signals MAP4<3:0> and MASK4, respectively, correspond to the two unused PCI interrupt signals. Register 530, which generates signals MAP3<3:0> and MASK3, corresponds to interrupt signal PC11_INTAC*. In like fashion, registers 532, 534 and 536 correspond to interrupt signals PC11_INTBD*, PC12_INTAC* and PC12_INTBD*, respectively. Thus, the mapping or redirection of a particular PCI interrupt signal can be accomplished by programming the corresponding MAP and MASK bits. For example, if interrupt signal PC11_INTAC* is to be mapped to a particular EISA interrupt request line, the register 530 is written with the proper value.

The contents of the data bus SD<7:4> and SD<0> are latched into the registers 522–536 on the falling edges of signals WT_INDEX<7:0>; that is, data is latched into register 522 on the falling edge of WT_INDEX7, data is latched into register 524 on the falling edge of WT_INDEX6, etc. The signals WT_INDEX<7:0> are generated when a write operation is directed to a register at arbitrary address 0C01h, with the value of a previously written index register, located at an arbitrary address of 0C00h, selecting which of the 8 WT_INDEX<7:0> signals is activated by the write operation to address 0C01h.

Figure 6:
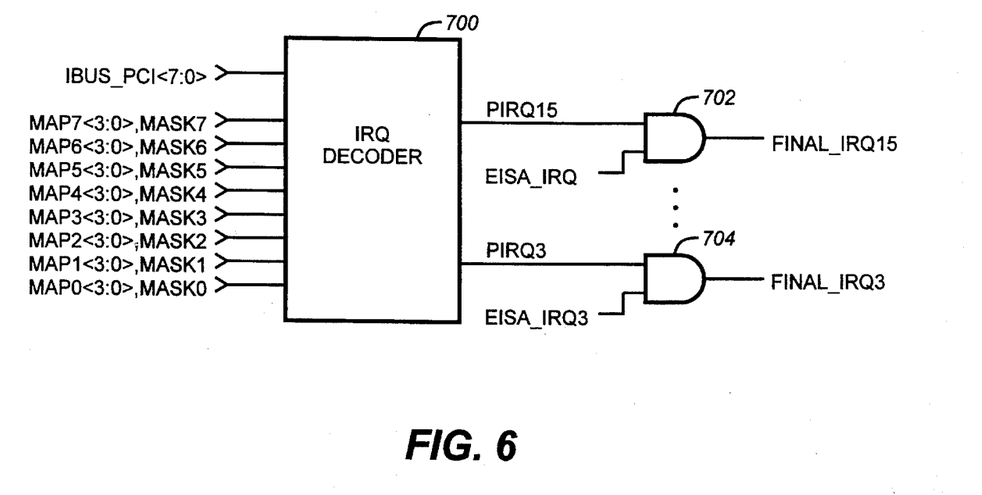
FIG. 6 is a decoder for generating the final interrupt signals from the PCI interrupt signals, the mapping and masking information, and the EISA interrupt signals.
Figure 7:
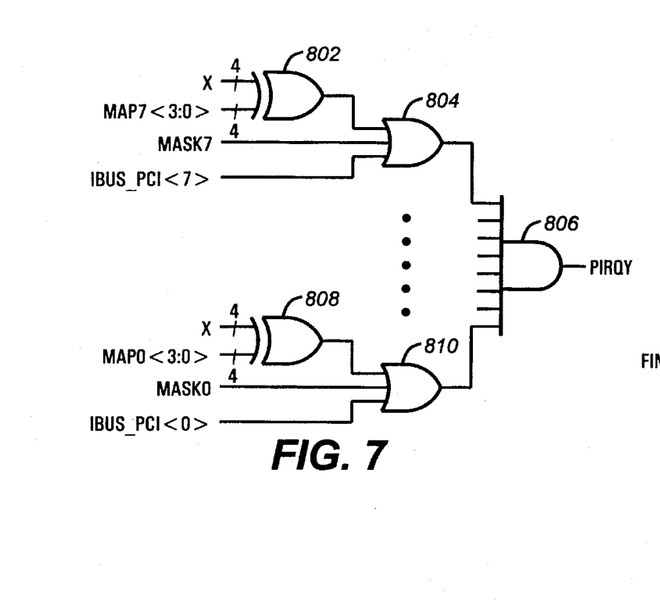
FIG. 7 is a decoder for generating the PIRQ interrupt signals.
Figure 8:
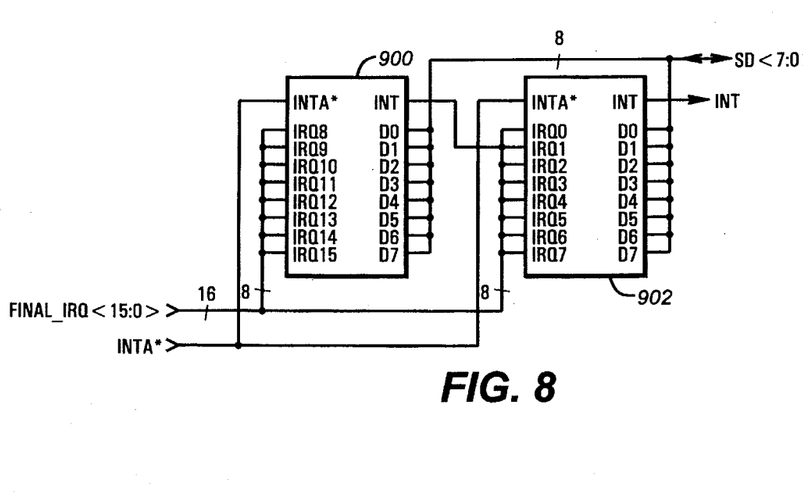
FIG. 8 is the interrupt controller which includes two 8259 programmable controllers.

Referring now to FIG. 6, the decode logic for producing the final interrupt request lines is shown. It is noted that the decode logic of FIG. 6 is part of the miscellaneous system logic chip 132. An IRQ decoder 700 receives the signals IBUS_PCI<7:0>, the map signals MAPX<3:0> and the mask bits MASKX, wherein X represents the values 7 through 0. As discussed above, the signals IBUS_PCI<7:0> represent the state of the PCI interrupt signals. The IRQ decoder 700 generates signals PIRQ15, PIRQ14, PIRQ12, PIRQ11, PIRQ10, PIRQ9, PIRQ7, PIRQ6, PIRQ5, PIRQ4 and PIRQ3. The logic for the signals generated by the IRQ decoder 700 is shown in FIG. 7. A comparator 802 compares the value represented by signals MAP7<3:0> with the value X, wherein X represents the values 0Fh, 0Eh, 0Ch, 0Bh, 0Ah, 09h, 07h, 06h, 05h, 04h and 03h. The output of the comparator 802 is provided to an OR gate 804. The other inputs of the OR gate 804 receive the signals MASK7 and IBUS_PCI<7>. Thus, if the value of the signals MAP7<3:0> is equal to the value represented by X, the comparator 802 outputs a low state to the input of the OR gate 804. If the signals MASK7 and IBUS_PCI<7> are also low, then the OR gate 804 outputs a low state to an input of an 8-input AND gate 806. The comparator 802 and OR gate 804 described above are repeated 7 times for signals MAP6<3:0>, MASK6, IBUS_PCI<6>; MAP5<3:0>, MASK5, IBUS_PCI<5>; MAP4<3:0>, MASK4, IBUS_PCI<4>; MAP3<3:0>, MASK3, IBUS_PCI<3>; MAP2<3:0>, MASK2, IBUS_PCI<2>; MAPI<3:0>, MASK1, IBUS_PCI<1>; and MAP0<3:0>, MASK0, IBUS_PCI<0>, respectively. The outputs of the 8 OR gates are connected to the 8 inputs of the AND gate 806. If the outputs of any of the OR gates is driven low, the AND gate 806 drives the signal PIRQY low, wherein Y represents the values 15, 14, 12, 11, 10, 9, 7, 6, 5, 4 and 3. Thus, the circuitry represented in FIG. 8 is repeated 11 times to represent the 11 PIRQY signals. A PIRQ interrupt signal being asserted low indicates that the particular interrupt signal is active.

Thus, for example, if it is desired that the PCI interrupt signal INT1l_AC* be mapped to interrupt request line IRQ11, then the signals MAP3<3:0> and MASK3 are set to the values 0Bh and 0, respectively. It is noted that setting any MASK bit high would cause the corresponding PCI interrupt signal not to be mapped. For example, if MASK7 is set high, then the PCI interrupt signal GGATE_INTB* would not be mapped to any IRQ line.

Each PIRQ interrupt signal generated by the IRQ decoder 700 corresponds to an EISA_IRQ signal. Thus, PIRQ15 corresponds to EISA_IRQ15, PIRQ14 corresponds to EISA_IRQ14, etc. In other words, each PIRQ interrupt signal would cause the interrupt controller to provide the vector associated with the interrupt service routine that would have been provided had the corresponding EISA_IRQ interrupt signal been asserted. Thus, the signal PIRQ15 is ANDed with the signal EISA_IRQ15 by AND gate 702 to produce a signal FINAL_IRQ15. This is repeated for the other interrupt signals: the signal PIRQ14 is ANDed with the signal EISA_IRQ14 to produce a signal FINAL IRQ14, the signal PIRQ12 is ANDed with the signal EISA IRQ12 to produce a signal FINAL_IRQ12, etc. The FINAL_IRQ interrupt signals are provided to the interrupt controller in the miscellaneous system logic chip 132.

Referring now to FIG. 8, the interrupt controller in the miscellaneous system logic chip 132 is shown. As was discussed earlier, the EISA interrupt controller comprises essentially two 8259 programmable interrupt controllers 900 and 902, augmented as customary in EISA system use to include an Edge/Level Control Register. The interrupt controller 900 is classified as the slave interrupt controller, and it receives the interrupt signals FINAL IRQ<15:8>. The interrupt controller 902 is classified as the master interrupt controller, and it receives interrupt signals FINAL_IRQ<7:0>. It is noted that the decode logic of FIG. 6 does not generate the signals FINAL IRQ<13>, FINAL_IRQ<8>, FINAL_IRQ<2>, FINAL_IRQ<1>and FINAL_IRQ<0>. The interrupt signals FINAL_IRQ<13>, FINAL_IRQ<8>, FINAL_IRQ<1>and FINAL_IRQ<0>are simply equated to the EISA interrupt signals EISA_IRQ<15>, EISA_IRQ<8>, EISA_IRQ<1>and EISA_IRQ<0>, respectively. The IRQ2 input to the master interrupt controller 902 comes from the interrupt output of the slave interrupt controller 900. Each of the interrupt controllers 900 and 902 includes an interrupt request register (IRR) and an in-service register (ISR). The IRR is used to store all of the interrupt levels which are requesting service. Thus the IRR in the master interrupt controller 902 receives the signals FINAL_IRQ<7:0>and the IRR in the slave interrupt controller 900 receives the signals FINAL_IRQ<15:8>. The ISR is used to store all of the interrupt levels which are being serviced by the microprocessor. If a bit in the ISR is set, then that indicates that the particular IRQ request is being serviced. Each of the interrupt controllers 900 and 902 also includes a priority resolver for determining the priorities of the bits in the IRR. In addition, each of the interrupt controllers 900 and 902 also includes an interrupt mask register for storing the bits for masking the interrupt signals FINAL_IRQ<15:0>. If one or more of the interrupt signals FINAL_IRQ<15:0>are received by the interrupt controllers 900 and 902, the interrupt controllers respond by determining the priority of the asserted interrupt signals and determining if the mask bit associated with any of the asserted interrupt signals is set. If a mask bit corresponding to a FINAL_IRQ line is set high, that FINAL_IRQ line being asserted is ignored.

As noted above, the 8259 interrupt controllers respond to a signal INTA* being asserted, which indicates that the microprocessor is executing an interrupt acknowledge cycle. When the signal INTA* is asserted indicating the occurrence of an interrupt acknowledge cycle, then one of the interrupt controllers 900 and 902 responds by providing the interrupt vector to the data bus SD<7:0>. If the interrupt controllers determine that any one of the asserted FINAL_IRQ<7:0>interrupt signals has the highest priority, then the master interrupt controller 902 provides the interrupt vector. If it is determined that the one of the FINAL_IRQ<15:8>signals has the highest priority, then the slave interrupt controller 900 asserts its INT output, which is connected to the IRQ2 input of the master interrupt controller 902. This indicates to the master controller 902 that the slave interrupt controller 900 will provide the interrupt vector. The microprocessor determines the address of the appropriate interrupt service routine from the interrupt vector. The interrupt service routine is then executed. It is noted that if a particular IRQ line is shared either between multiple PCI interrupts or between a PCI interrupt and an EISA interrupt, then the interrupt service routine would have to poll the appropriate peripheral devices to determine which one actually asserted the interrupt signal.

The IRQ interrupt inputs to the interrupt controllers 900 and 902 can be programmed to be either edge sensitive or level sensitive. This is accomplished by programming the bits in an Edge/Level Control Register in the interrupt controllers 900 and 902. Since the PCI specification requires that its interrupt signals must be level sensitive, the EISA IRQ lines to which the PCI interrupt signals are to be mapped must be set to level sensitive mode if sharing is to occur. Otherwise, while a multiple drive source problem may not occur as in a conventional EISA system, one interrupt could be missed if it occurred while another at the same level was already present.

Thus, a system is described for the redirection or mapping of PCI interrupt signals to EISA interrupt signals. The system has the flexibility of allowing a PCI interrupt signal to be mapped to any EISA interrupt signal, and it also has the flexibility of allowing sharing between PCI interrupts as well as between a PCI interrupt and an EISA interrupt. The actual mapping is performed during the Power On Self Test (POST) procedure, where the computer writes appropriate values into a set of MAP and MASK registers. Each MAP and MASK register corresponds to a PCI interrupt. Thus, by programming the appropriate MAP and MASK register to certain values, the corresponding PCI interrupt can be mapped to the desired EISA IRQ line.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A device for mapping a set of interrupt signals generated on a bus of a first type to a set of interrupt signals defined by a bus of a second type, wherein the first bus is different from the second bus, and wherein any interrupt signal in the first set is capable of being mapped to any interrupt signal in the second set, the device comprising:

latching means connected to the first bus for latching interrupt signals generated on the first bus;

mapping means for storing data indicative of the mapping of each interrupt signal of the first bus to an interrupt signal of the second bus;

decoding means connected to said first bus interrupt signal latching means and said mapping means for generating a third set of interrupt signals based on said mapping data and the first set of interrupt signals, wherein each interrupt signal in said third set corresponds to an interrupt signal in the second set; and means connected to the second bus to receive the second set of interrupt signals and to said third set of interrupt signals for combining each interrupt signal in the second set with the corresponding interrupt signal in the third set to produce a final set of interrupt signals.

2. The mapping device of claim 1, wherein said first bus interrupt signal latching means includes:

a shift register responsive to a load signal and a clock signal and being connected to the first bus for latching in the interrupt signals when said load signal is asserted and for serially outputting the interrupt signals when said clock signal is asserted; and a register responsive to said clock signal and being connected to said shift register for receiving data contained in said shift register one bit at a time on the assertion of each clock signal and providing a parallel output of said first set of interrupt signals.

3. The mapping device of claim 1, wherein said mapping means includes:

a plurality of mapping data registers connected to the second bus, the number of mapping data registers being equal to the number of interrupt signals on the first bus, wherein each mapping data register corresponds to an interrupt signal generated on the first bus.

4. The mapping device of claim 3, wherein each of said mapping data registers is capable of being programmed to a value corresponding to an interrupt signal of the second set, and wherein programming a mapping register to said value causes the first set interrupt signal corresponding to the mapping data register to be mapped to the second set interrupt signal corresponding to said value.

5. The mapping device of claim 4, wherein more than one of said mapping data registers are capable of being programmed to the same value.

6. The mapping device of claim 1, wherein said mapping data includes mask bits, the number of mask bits being equal to the number of interrupt signals on the first bus, each mask bit corresponding to one interrupt signal on the first bus, a mask bit being set causing the corresponding interrupt signal on the first bus not to be mapped to an interrupt signal in the second set.

7. The mapping device of claim 1, wherein said second set of interrupt signals further comprises additional interrupt signals and wherein the first set of interrupt signals are not mappable to said additional interrupt signals.

8. A computer system comprising:

a microprocessor having an interrupt signal input;

a bus of a first type, said first bus being coupled to said microprocessor and said first bus including a plurality of interrupt signals;

a bus of a second type having a plurality of interrupt signals, wherein said interrupt signals on said second bus are different from said interrupt signals on said first bus;

a device coupled between said first and second buses for mapping said first type interrupt signals to said second type interrupt signals, wherein any first type interrupt signal capable of being mapped to any second type interrupt signal, said device including:

latching means connected to said first bus for latching said first type interrupt signals;

mapping means for storing data indicative of the mapping of each interrupt signal of said first bus to an interrupt signal of said second bus;

decoding means connected to said first bus interrupt signal latching means and said mapping means for generating a third set of interrupt signals based on said mapping data and said first type interrupt signals, wherein each interrupt signal in said third set corresponds to a second type interrupt signal; and means connected to said second bus to receive the second type interrupt signals and to said third set of interrupt signals for combining each second type interrupt signal with the corresponding interrupt signal in the third set to produce a final set of interrupt signals; and an interrupt controller responsive to said final set of interrupt signals for generating a microprocessor interrupt signal provided to said microprocessor interrupt signal input.

9. The computer system of claim 8, wherein said first bus interrupt signal latching means includes:

a shift register responsive to a load signal and a clock signal and being connected to the first bus for latching in the interrupt signals when said load signal is asserted and for serially outputting the interrupt signals when said clock signal is asserted; and a register responsive to said clock signal and being connected to said shift register for receiving data contained in said shift register one bit at a time on the assertion of each clock signal and providing a parallel output of said first set of interrupt signals.

10. The computer system of claim 8, wherein said mapping means includes:

a plurality of mapping data registers connected to the second bus, the number of mapping data registers being equal to the number of interrupt signals on the first bus, wherein each mapping data register corresponds to an interrupt signal generated on the first bus.

11. The computer system of claim 10, wherein each of said mapping data registers can be programmed to a value corresponding to an interrupt signal of the second set, and wherein programming a mapping register to said value causes the first set interrupt signal corresponding to the mapping data register to be mapped to the second set interrupt signal corresponding to said value.

12. The computer system of claim 11, wherein more than one of said mapping data registers are capable of being programmed to one value.

13. The computer system of claim 8, wherein said mapping data includes mask bits, the number of mask bits being equal to the number of interrupt signals on the first bus, each mask bit corresponding to one interrupt signal on the first bus, a mask bit being set causing the corresponding interrupt signal on the first bus not to be mapped to an interrupt signal in the second set.

14. The computer system of claim 8, wherein said second set of interrupt signals further comprises additional interrupt signals, and wherein the first set of interrupt signals are not mappable to said additional interrupt signals.

* * * * *

UNITED STATES PATENT AND TRADEMARK OFFICE
CERTIFICATE OF CORRECTION

PATENT NO. : 5,506,997
DATED : April 9, 1996
INVENTOR(S) : DAVID J. MAGUIRE AND PATRICK L. FERGUSON It is certified that error appears in the above-identified patent and that said Letters Patent is hereby corrected as shown below:

In the title, please delete "COMBING" and insert therefor --COMBINING--.

Signed and Sealed this

Twenty-second Day of October, 1996

Attest:

BRUCE LEHMAN

Attesting Officer        Commissioner of Patents and Trademarks